Patented Apr. 4, 1944

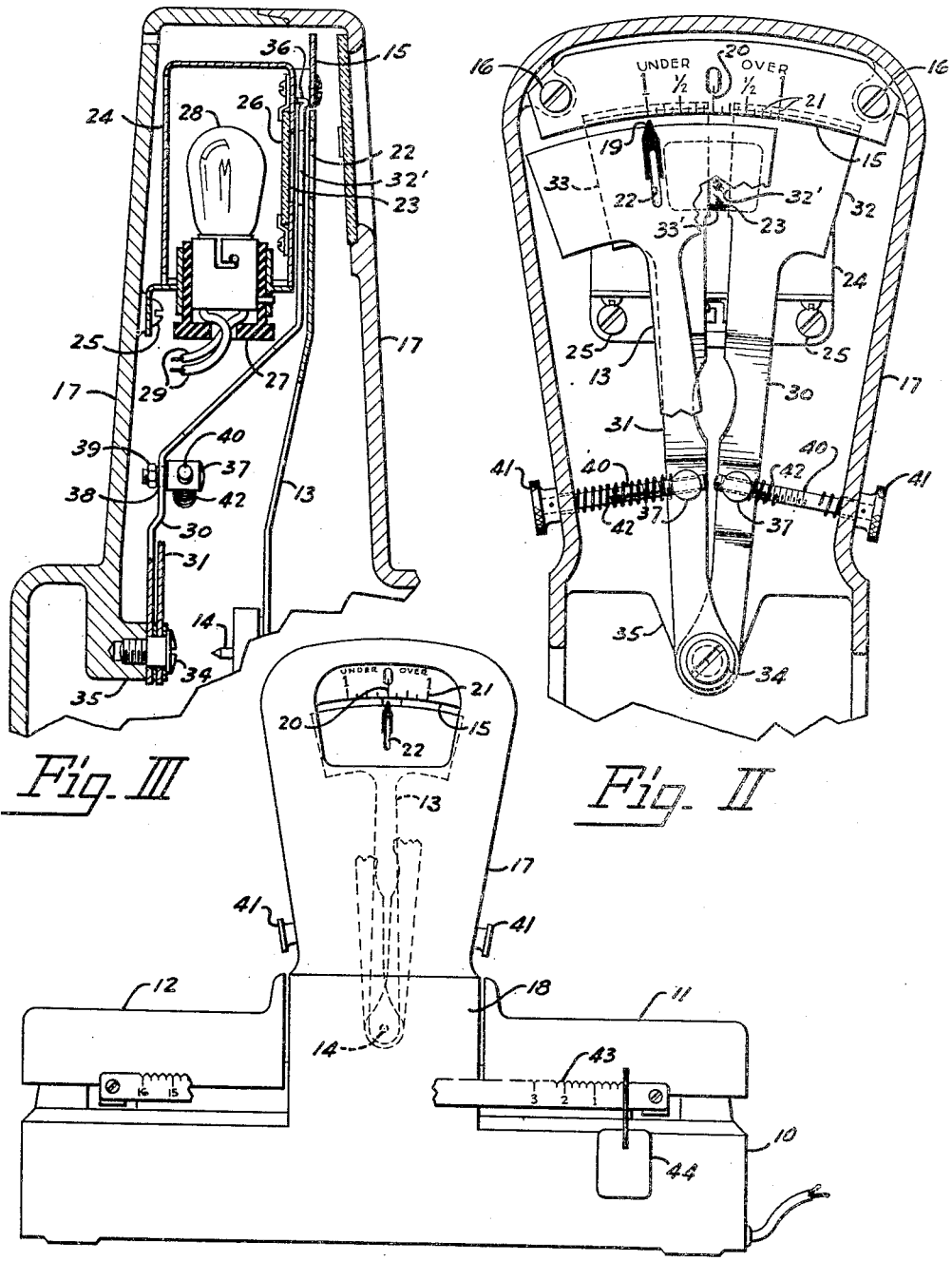

2,346,108

UNITED STATES PATENT OFFICE 2,346,108

WEIGHING SCALE

Donald B. Kendall, Toledo, Ohio, assignor to Toledo Scale Company, Toledo, Ohio, a corporation of New Jersey Application October 9, 1941, Serial No. 414,247

6 Claims. (Cl. 116—114)

This invention relates generally to scales, and more particularly to improvements in scales which are employed in filling containers with a predetermined amount of material. The invention is applicable to scales used in retail shops, as well as in wholesale houses and producing plants where material is packed into containers without the aid of automatic machinery. The invention however may also be used in connection with automatic filling machines of certain types to furnish a readily visible means for observing whether the machine is functioning properly.

Scales employed for packing predetermined amounts of material into containers, whether of the "beam and poise" type or automatically indicating type, are "back-weighted" the amount of the predetermined load and the means for indicating the weight, while the operator is filling the material into the container, show no movement until just before the predetermined amount has been placed into the container and the operator may not detect this movement in time to substantially stop a rapid flow of material and then continue to "dribble" in until the desired amount is reached. The result is that more material is frequently placed into the container than is necessary. This requires an extra operation to remove the excess, which adds considerably to the cost of packing.

In the present invention, the approach of balance is indicated to the operator by a beam of brilliant light which becomes visible at the instant the indicator starts to move away from its position of rest, when the amount of material accumulating in the container nearly balances the amount that the scale is "back-weighted."

The embodiment of the invention is also adapted for use in connection with automatic package-filling machines when the weighing device used therewith is equipped with a movable indicator or other member movable in response to the load. In such automatic package-filling machines there is no need for a near weight detector since the mechanism automatically senses the approach of balance and reduces the stream of material being fed to a "dribble." The embodiment of the invention may be conditioned so that the light beam indicates that the material in the weighing hopper is within the prescribed "plus or minus" tolerance. This enables the operator, even when stationed at a point remote from such indicating means, to observe if the filling machine is depositing the correct amount of material into the container.

The principal object of this invention is the provision of improved means for strikingly indicating the approach of balance in a weighing device.

A further object is the provision of improved means for displaying a light signal.

A further object is the provision of improved means for substantially predetermining the interval between a signal indicating approaching balance and the condition of balance of a weighing device.

A still further object is the provision of improved means for displaying a widely visible signal for the operator of an automatic filling machine to indicate the condition of balance of the device.

These, and other objects and advantages will be apparent from the following description in which reference is had to the accompanying drawing, illustrating a preferred embodiment of the invention and wherein similar reference numerals refer to similar parts throughout the several views.

In the drawing:

Fig. I is a front elevational view of a scale embodying the invention.

Fig. II is an enlarged front elevational view, in section, of the indicator housing; and, Fig. III is a sectional end elevation thereof.

Referring to the drawing in detail:

The scale in which the invention is shown embodied comprises a base 10 in which an even-armed lever (not shown) is pivotally mounted. A load platter 11 and a counterpoise platter 12 are pivotally supported on the opposite ends of this lever. Suitable means (not shown) are also provided for maintaining the condition of level of the platters 11 and 12. An indicator 13, pivoted as at 14 and operatively connected to the lever, serves to indicate the condition of balance of the device in cooperation with a chart 15 bolted as at 16 to suitable bosses in the interior of an indicator housing 17 erected upon a centrally positioned, upwardly extending deck portion 18 of the base 10.

The upper portion of the indicator 13, which is stamped from sheet metal, is made substantially paddle-shaped and having an upper arcuate edge which is concentric with the arcuate lower edge of the chart 15. This paddle-shaped portion of the indicator 13, being bent for this purpose, lies in the plane of the chart 15. A small pointed projection 19, extending from the arcuate edge, serves as an index and cooperates with a zero indicium 20, printed or otherwise marked on the face of the chart 15, and with a series of graduations and designating numerals 21. These graduations and numerals, extending on both sides of the zero indicium 20, are adapted to indicate in cooperation with the index 19, in the usual manner, the amount in units of weight that a load on the load platter 11 is in excess or in deficiency of the standard weight on the counterpoise platter 12.

On an axis which passes through the point of the index 19 and the axis of the fulcrum of the indicator 13 is a small slot-like aperture 22 having parallel walls. The aperture 22, when the scale approaches the condition of balance, overlies a small window or opening 23 in a sheet metal lamp housing 24 fastened as at 25 to bosses on the rear wall of the indicator housing 17. The opening 23, for the purpose of preventing dust entering the housing 24, is covered by a small pane of glass 26, and this glass may, if desired, be colored for a reason which will later become apparent. Located in the interior of the lamp housing 24, by means of a socket 27 which is readily removable, is a small electric lamp 28 adapted to be connected to a current source by means of leads 29.

For a purpose which will later be described, two pivotally mounted upwardly extending arms 30 and 31 are provided with flag-like extensions 32 and 33 respectively. These arms are pivoted on the shoulder of a screw 34, threaded into a boss 35 extending forwardly from the rear wall of the housing 17, and are bent so that the extensions 32 and 33 are positioned between the indicator 13 and the front wall of the lamp housing 24. A ridge is formed adjacent the upper edges of the extensions and the inwardly turned edge of this ridge forms a flange 36 adapted to rest against the lamp housing 24, the outer surface of the ridge engaging the rear face of the chart 15. This definitely supports the upper ends of the arms 30 and 31 and prevents lateral displacement which might interfere with the freedom of the indicator 13.

To enable the arms 30 and 31 to be radially adjusted about their fulcrum on the screw 34, each of these arms is provided with an extending stud 37. This stud has a shoulder 38 which projects through a suitable hole in the arm and is retained therein by means of a nut 39 screwed on a threaded stem, tightly against this shoulder. The shoulder 38 of the stud however is a trifle longer than the thickness of the metal from which the arms 30 and 31 are made so that it may swivel when the angle of the arm is changed by means of a screw 40. This screw, which is provided with a knurled head 41, extends through the side wall of the housing 17 and is threaded through a hole drilled transversely through the stud 37. The bias of a compression spring 42, which encircles the body portion of the screw 40 and whose opposite ends engage the inner wall of the housing 17 and the stud 37, serves to hold the arm in adjusted position.

The scale is also equipped with a tare beam 43 and a poise 44 for the purpose of taring out the weight of the containers.

In conditioning the device to fill cartons with one pound of solid fluent material, for example sugar, the operator first places an empty carton upon the load platter 11, then tares the weight of this carton by moving the poise 44 on the beam 43 until the index 19 of the indicator 13 again points to the zero indicium 20 on the chart 15, and places a standard one-pound weight upon the counterpoise platter 12, the amount to be filled into the container. The operator then carefully fills sugar into the container until a slight movement of the index 19 is observed. Then by turning the knurled head 41 of the screw 40, threaded into the stud 37 extending from the arm 31, the operator moves this arm 31 in an anticlockwise direction until the right-hand edge 33' (as seen in Fig. II) of the flag-like extension 33 comes into registration with the right-hand edge of the aperture 22 in the indicator 13. Any further addition of sugar into the container causes the aperture 22 to move beyond the edge 33' of the flag-like extension which partially covers the opening in the lamp housing 24, and permits light from the lamp 28, assuming that this has been energized, to shine through the aperture 22. The appearance of this light, which is visible only through the slot 22 in the indicator, since its paddle-shaped portion otherwise covers the opening 23, serves notice that the sugar in the container is nearing the predetermined weight and that caution must be observed in pouring the remainder. In certain locations, depending upon the lighting conditions, it may be advantageous to use colored glass for the pane 26 so that the operator's attention may be more quickly directed to the appearance of the light beam. The left-hand edge 32' of the flag-like extension 32 of the arm 30 may be adjusted so that the flag-like extension 32 will cover the aperture 22 in the indicator 13 when the index 19 of this indicator is in registration with the zero indicium 20 on the chart 15. Thus the appearance of the light beam signals the approach of balance and the instant of its disappearance, the accumulation of the predetermined load.

In automatic filling machines it is customary to establish a tolerance in the weight of a package. The lower limit of the tolerance is usually "correct" weight and the upper limit a small overage. By adjusting the adjacent edges 32' and 33' of the arms 30 and 31 in the manner hereinbefore described so as to define the limits of this tolerance, any deviation from this tolerance will result in a beam of light having less intensity and thus serving notice to the operator that adjustments of the filling machine must be made.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, in combination, an indicator housing, an indicator movably mounted within said housing and adapted to move distances proportionate to weight, a chart fixedly stationed within said housing adjacent the path of movement of said indicator, indicia marked on said chart, said indicia representing units of weight, a lamp housing, an electric lamp mounted within said lamp housing, said lamp housing having a window and a pair of members movably positioned in front of such window and adapted to intercept light emanating from said electric lamp, said light intercepting members having adjacent edges positioned substantially in the same plane, means for independently adjusting the position of each of said light intercepting members whereby the effective length of such window in said lamp housing may be adjusted to correspond to the distance between a predetermined number of said weight indicia on said chart, said movable indicator having a portion designed and constructed to overlie such window in said lamp housing, a physical characteristic on said movable indicating member for cooperation with said indicia on said chart and a second physical characteristic on said indicator for cooperation with such window in said indicator housing.

2. In a device according to claim 1, in which the secondly mentioned physical characteristic on said movable indicator is a slot-like aperture in that portion of said indicator overlying such window in said lamp housing.

3. In a device of the class described, in combination, an indicator housing, an indicator pivotally mounted within said housing and adapted to rock about its pivot through angles proportionate to weight, a chart fixedly mounted in said housing adjacent the path of movement of said pivotally mounted indicator, a series of weight indicia marked on said chart, a lamp housing stationed within said indicator housing and in back of said fixedly mounted chart, a window in said lamp housing, an electric lamp mounted within said lamp housing, a light intercepting member pivoted within said indicator housing, said light intercepting member having at least one straight edge, means for adjusting the position of said light intercepting member, said adjusting means comprising means operatively attached to said light intercepting member and extending exteriorly of sa'd housing and being adapted to adjust the position of said light intercepting member to modify the effective area of such window in said lamp housing, said indicator having a portion designed and constructed to overlie such window in said lamp housing and having a slot-like aperture therein whereby in cooperation with said adjustable light intercepting member a portion of the area of such window in said lamp housing is exposed through said slot-like opening in said indicator at a predetermined point of the movement of the indicator.

4. In a device of the class described, in combination, a pivoted indicating member adapted to rock about its pivot through angles proportionate to weight, a chart mounted adjacent the path of movement of said pivoted indicating member, a light source, said pivoted indicating member having a portion designed and constructed to overlie said light source throughout its entire movement, that portion of said pivoted indicating member overlying said light source having a slot-like aperture, a series of weight graduations marked on said chart, an index on said pivotally mounted indicator for cooperation with said series of weight graduations, a pair of light intercepting members pivoted upon a common axis, said axis being in coincidence with the pivotal axis of said indicating member and means for adjusting the positions of said pair of light intercepting members relative to each other and to said graduations on said chart.

5. In a device of the class described, in combination, a pivoted indicator for a condition responsive mechanism, a light source behind the plane of movement of said indicator, said pivoted indicator having an opaque portion for interrupting light from said source and a slot for transmitting light from said source, and a pair of opaque vanes mounted between said light source and said indicator to interrupt light from said source and thus define limits of the zone of indicator travel between which said slot is illuminated, the mounting for said vanes being adjustable to vary the position the length of said zone.

6. In a device of the class described, in combination an indicator actuated by a condition responsive mechanism, a light source behind the plane of movement of said indicator projecting a beam of light through the plane of movement of said indicator, a pair of vanes to define the limits of said light beam in the direction of indicator travel, adjusting means for said vanes whereby said light beam may be varied in width and location, a mask on said indicator for interrupting said light beam provided with a slot for transmitting a portion of said light beam when said indicator is in position and to register said slot with said light beam as defined by said vanes.

DONALD B. KENDALL.